United States Patent [19]
Goodman

[11] 3,896,659
[45] July 29, 1975

[54] METHOD FOR DETERMINING THE ETHANOL CONTENT OF ALCOHOLIC BEVERAGES

[75] Inventor: Donald E. Goodman, Jacksonville, Fla.

[73] Assignee: Bacardi and Company, Ltd., Vaduz, Liechtenstein

[22] Filed: Oct. 4, 1973

[21] Appl. No.: 403,413

Related U.S. Application Data

[63] Continuation-in-part of Ser. No. 391,522, Aug. 27, 1973, abandoned.

[52] U.S. Cl. .................................. 73/23.1; 55/67
[51] Int. Cl. ......................................... G01n 31/08
[58] Field of Search ........... 73/23.1, 23; 55/67, 197, 55/386; 23/232 C, 254 R

[56] References Cited
UNITED STATES PATENTS

| | | | |
|---|---|---|---|
| 3,177,138 | 4/1965 | Larrison | 73/23.1 X |
| 3,306,096 | 2/1967 | Hana et al. | 73/23.1 |
| 3,557,531 | 1/1971 | McKinney | 55/67 |
| 3,717,028 | 2/1973 | Annino et al. | 73/23.1 |

OTHER PUBLICATIONS

"Porapak and Aeropak," Baumann et al., 1966.
Journal of Food Science, "Analysis of Volatile Components of Jamaica Rum," Maarse et al., 31 (6), pg. 951–954, 1966.

*Primary Examiner*—Jerry W. Myracle
*Assistant Examiner*—Stephen A. Kreitman
*Attorney, Agent, or Firm*—Pennie & Edmonds

[57] ABSTRACT

The volumetric ethanol content of a liquid mixture containing water and ethanol (e.g., an alcoholic beverage) is determined by gas-solid chromatography using aqueous ethanol of known composition as an external calibration standard. A pre-determined volume of sample mixture to be analyzed is injected into a gas chromatographic column containing a solid hydrophobic microporous adsorbent and chromatographed. The adsorbent is a non-polar organic copolymer derived from divinyl benzene as a cross-linking agent and a hydrocarbon monomer possessing a polymerizable $-CH{=}CH_2$ substituent (e.g., styrene, ethylvinyl benzene). An external calibration standard prepared by mixing a known volume of water with a known volume of ethanol is likewise separately chromatographed. The components of each injected sample are separated as they travel through the column and then detected by a thermal conductivity detector, thereby generating signals which are amplified and converted to digital form. The digital values corresponding to the amplified detector signals are transmitted to an integrator. Concurrently, analog signals can be transmitted to a chart recorder which registers the signals on a chromatogram as a series of peaks corresponding to the water and ethanol components of the sample mixture and external standard. The integrator provides a report of the numerical areas under the peaks, which is subjected to mathematical treatment to arrive at the volumetric content of ethanol in the sample mixture.

8 Claims, 4 Drawing Figures

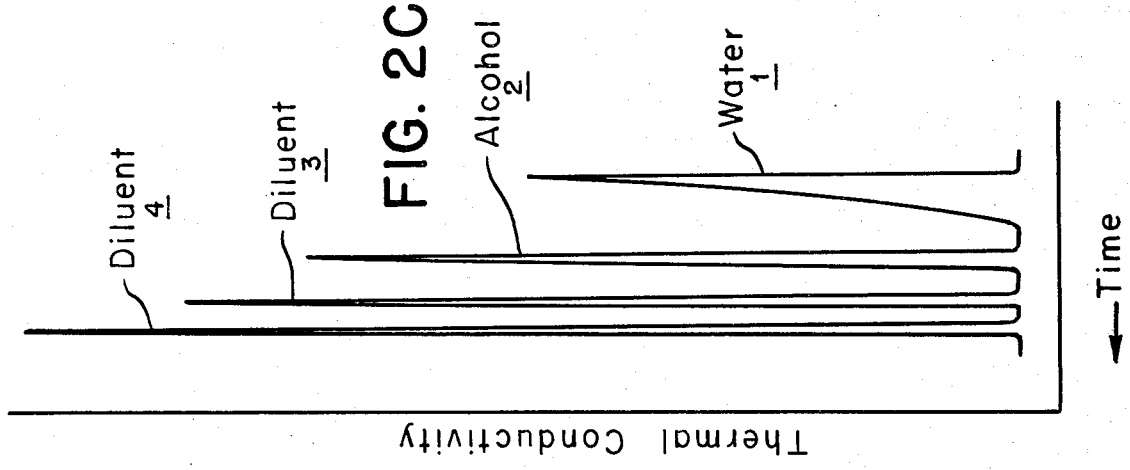
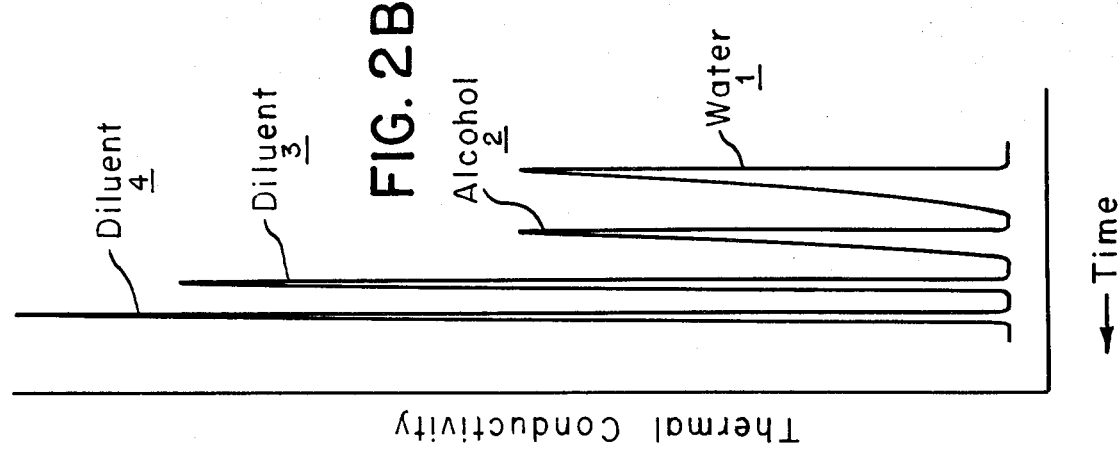
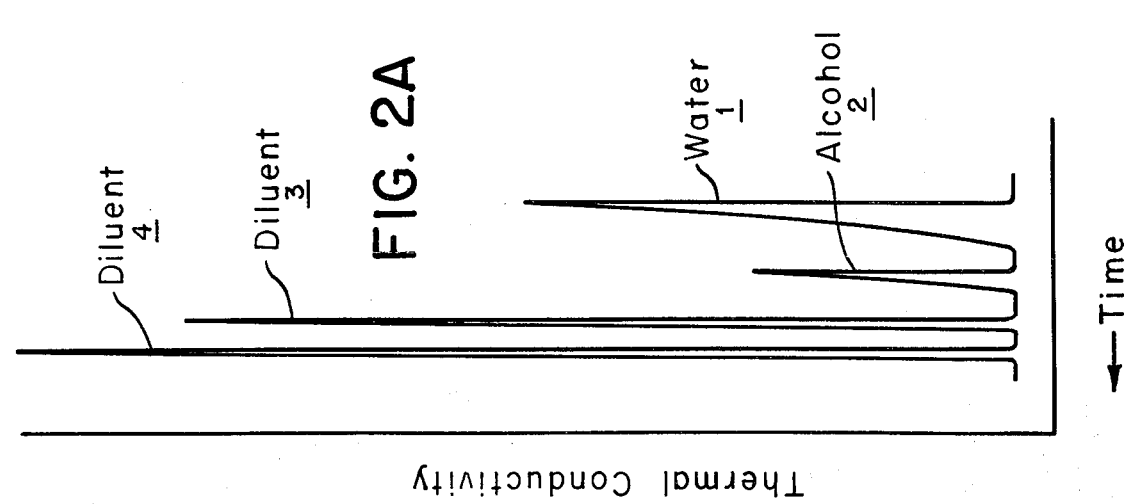

METHOD FOR DETERMINING THE ETHANOL CONTENT OF ALCOHOLIC BEVERAGES

CROSS-REFERENCE TO RELATED APPLICATION

This is a continuation-in-part of application Ser. No. 391,522 filed Aug. 27, 1973 now abandoned.

BACKGROUND OF THE INVENTION

This invention relates to analysis of liquid mixtures containing ethanol and water to determine the ethanol content thereof. More particularly, it relates to an improved process for determining the volumetric content of ethanol in alcoholic beverages with sufficient accuracy to satisfy government requirements for the computation of federal excise taxes.

Under the Internal Revenue Code of 1954, an excise tax is imposed on alcoholic beverages the amount of which depends directly on the percent by volume of ethyl alcohol (ethanol) in the beverage. In determining the ethanol content or "proof" (defined as twice the percent ethyl alcohol content by volume of a liquid at 60°F.) of a beverage for purposes of ascertaining the applicable rate of excise tax, the U.S. Treasury Department *Gauging Manual* (1970) provides for gauging procedures involving distillation coupled with density and temperature measurements to be performed on the beverage to a high degree of accuracy, particularly in those cases where the solids content of the beverage exceeds, at the time of incurrence of tax liability, 600 milligrams per 100 milliliters of beverage. These procedures, which must be conducted on a frequent basis, are time-consuming, costly, and always subject to potential error notwithstanding the extensive precautions prescribed in those procedures. The economic impact of these factors can be appreciated from the fact that in 1971, for example, a total of 4.8 billion dollars in federal alcohol taxes were collected according to the *Statistical Abstract of the United States*, 1972. This amount is 2.5 percent of the total taxes collected in 1971 by the federal government. Aside from individual and corporate income and employment taxes, alcohol excise taxes represent the largest tax on a single item or substance. It is the third largest source of income for the U.S. Government and exceeds by more than 1.25 billion dollars the revenue obtained from gasoline, the next highest taxed item. Therefore, any alternative method for proofing or gauging alcholic beverages which obviates one or more of the aforementioned drawbacks inherent in the distillation-density measurement approach would be of great value and importance to the distilled spirits industry. The present invention provides such an alternative in the form of a gas chromatographic method whereby the separation and quantification of the water and ethanol components are accomplished quickly and automatically, with low operational cost, and to a degree of consistent accuracy greater than that heretofore obtainable by the current method involving distillation and density measurements.

Chromatography is a procedure by which substances are separated by the passage of a mixture of them through a fixed porous bed possessing a varying but reversible affinity for the individual components.

The general chromatographic technique requires that a solute undergo distribution between two phases, one of them fixed (stationary phase), the other moving (mobile phase). The mobile phase transfers the solute through the stationary phase until it eventually emerges, separate from other solutes that are eluted earlier or later. Generally, the solute is transported through the separation medium by means of a flowing stream of a liquid or a gaseous solvent known as the "eluant." The stationary phase may act through adsorption, as in the case of adsorbants such as activated alumina, silica gel, cellulose fibers, and ion-exchange resins, or it may act by dissolving the solute, thus partitioning the latter between the stationary and mobile phases.

In gas chromatography, the moving phase is a gas. The stationary phase is either a solid or a liquid, or a combination of both. In gas-solid chromatography, the stationary phase is a solid immobilized on a finely divided, inert solid support, such as chromatographic siliceous earth, crushed firebrick, glass beads, or even the inner wall of a small-diameter tube.

In principle, the mobile gas phase continuously moves over the stationary liquid (gas-liquid chromatography) or solid (gas-solid chromatography) phase. When a vaporized substance is introduced into the gas stream at the entrance to the column, it is swept into the column by the "carrier gas" and undergoes distribution between the gas and liquid or solid phases in a more or less stepwise manner.

In the basic apparatus required to perform gas chromatographic separations, carrier gas, usually available in compressed form in a cylinder fitted with a suitable pressure-reducing valve, is conducted through a flow meter to a sample injection port. Helium is the carrier gas of choice, because of its inertness and high thermal conductivity relative to most organic substances. Since solutes to be chromatographed must be in the vapor phase, the injection port is heated to a temperature high enough to ensure rapid vaporization but not so high as to cause thermal degradation. Samples are generally injected by means of a syringe through a silicone rubber septum in the injection port. The sample may be injected directly into the column packing so that its vapor mixes nearly instantaneously with the flowing carrier gas and is swept into the column, which is the main part of the chromatograph. This allows separation of the components of the vaporized sample by virtue of their different interactions with the stationary column packing. Maintenance of the column at a selected temperature determines the time for the passage of the sample components, and, to a degree, the resolution and efficiency obtained with the particular column.

As the components emerge individually from the end of the column, they enter a differential-type detector, which indicates the amount of component leaving the column. Control of the detector temperature to prevent condensation is essential. The temperature of the column may be varied according to a predetermined schedule.

The choice of detectors lies between those based on thermal conductivity and those based on flame ionization. The detector is coupled to a suitable automatic recording device, such as a recording potentiometer. The resulting record is a signal-time plot, which may then be used to determie the identities and concentrations of the components. The detector emits a signal proportional to the concentration of the solute in the carrier gas as it leaves the column. Thus, the chromatogram for each compound appears usually as a sharp peak on a time axis. A detector arrangement that provides such a signal is called a differential-type detector, and the resulting curves accurately represent the distribution process as it has occurred during the residence time of the solutes in the column. Such curves make quantitative analysis possible.

The use of gas chromatography to determine the ethanol content of a mixture containing water and ethanol is known. One such procedure is described, for example, in U.S. Pharmacopeia (18th ed. 1970) at pages 919–20. A similar method is described by G. E. Martin et al., J. Assn. Official Anal. Chemists, 56, 697–699 (1973) for application to non-beverage alcohol mixtures. The methods described in the foregoing references are dependent on the use of an internal standard for calibrating the analytical procedure, and, as a result, have been found to be insufficiently accurate for federal excise tax purposes. Other references dealing with previous attempts at quantitating the ethanol content of water-alcohol mixtures by gas chromatography are Zarembo et al., Analytical Chemistry, 31, 1833 (1959); Lyons et al., J. Clinical Chem., 10, 429 (1964); Davis, J. Forensic Sci., 205 (1966); Steinberg et al., J. Forensic Sci., 10, 201 (1965); Fox, Proc. Soc. Exper. Biol., 97, 236 (1958); Cooper, Clinical Chem. Acta, 33, 483 (1971); Freund, Anal. Chem., 39, 545 (1967); Solon, Hewlett-Packard Applications Lab Report; Harris, Analyst, 96, 306 (1971); Smith et al., J. Agricultural and Food Chem., 17, 34 (1969); Baker et al., J. Chromatographic Sci., 7, 312 (1969); Falcone, J. Assn. Official Anal. Chemists, 56, 684 (1973); Martin et al., Amer. Cosmetics and Perfumery, 87, 35 (1972); and Jain et al., J. Chromatographic Sci., 10, 263 (1972). Regardless of the particular details of the methods described in the foregoing references, a gas chromatographic method for determining the proof of alcoholic beverages (e.g., wines, sherrys, cordials, and distilled spirits such as rum, gin, vodka, whiskey, brandy) with high resolution of the alcohol and water components needed to obtain the accuracy and precision comparable to the currently used density methods has heretofore eluded the industry.

Accordingly, it is an object of the present invention to provide an improved gas chromatographic method for determining the volumetric ethanol content of liquid mixtures containing water and ethanol.

Another object is to provide a gas chromatographic method for rapidly measuring the volumetric ethanol content of liquid mixtures of water and ethanol for use in quality control during the manufacture and/or bottling of alcoholic beverages.

Yet another object is to provide a gas-solid chromatographic method for rapidly and automatically measuring the volumetric ethanol content of an alcoholic beverage with accuracy and precision sufficient for determining the applicable rate of federal excise tax.

These and other objects of the invention as well as the advantages thereof can be had by reference to the following description and appended claims.

SUMMARY OF THE INVENTION

The foregoing objects are achieved according to the present invention whereby a pre-determined volume of a sample whose percent by volume ethanol content is to be measured is injected into the column of a gas chromatograph containing a solid, organic polymeric adsorbent of the type described hereinbelow. The components of the sample are separated as they travel through the column in gaseous form along with the carrier gas and are then detected by a thermal conductivity detector, thereby generating signals (one for each component) which are amplified and converted to digital form. In a like manner, a mixture or solution of ethanol and water of known volumetric composition is chromatographed in order to serve as an external calibration standard. The digital values corresponding to the amplified detector signals are transmitted to a digital integrator while at the same time analog signals from the detector are fed to a chart recorder which converts the signals to a graphical series of peaks corresponding to the components of the sample mixture and external standard. The integrator prints out a report of the numerical areas under the peaks, which report is then subjected to mathematical treatment described hereinbelow to arrive at the volumetric content of ethanol in the sample mixture.

The high resolution, accuracy, and precision obtainable by the present invention are made possible by the discovery that water and ethanol mixtures can be effectively separated on a chromatographic column containing as the adsorbent a solid, microporous (average pore diameter of about 100 Angstroms or less), hydrophobic, nonpolar organic copolymer of divinyl benzene and a vinyl hydrocarbon monomer (e.g., ethylene), preferably a vinyl aromatic hydrocarbon monomer containing a single polymerizable —CH=CH$_2$ substituent (e.g., styrene, ethylvinyl benzene). The solid adsorbent is further characterized by having a high effective surface area, desirably greater than about 250 square meters per gram. Examples of suitable polyaromatic adsorbents of the type described hereinabove are Chromosorb 102 and Chromosorb 106 (both available from Johns-Manville, New York, N.Y.) and Porapak Q (available from Waters Associates, Framingham, Mass.). Chromosorb 102 is a solid microporous styrene-divinylbenzene copolymer having a surface area in the range of 300–400 square meters per gram. Its porous structure (average pore diameter of 85 Angstroms) is of an open-cell type so that solute molecules can readily penetrate the pores. Chromosorb 106 is similar in properties to Chromosorb 102; the principle difference between the two adsorbents resides in the ratios of the copolymerized styrene and dinvinylbenzene monomers, and the fact that Chromsorb 106 has a somewhat greater surface area (between 700 and 800 square meters per gram). Porapak Q is likewise a solid microporous polymer (average pore diameter of 75 Angstroms and 840 square meters per gram surface area), but derived from the copolymerization of divinylbenzene and ethylvinyl benzene. Desirably, the aforementioned adsorbents are employed without the use of a support therefor. Other suitable microporous solid polyaromatic adsorbents and methods for producing same are described in O. L. Hollis, J. Chromatographic Sci., 11, 335–342 (1973) and S. B. Dave, J. Chromatographic Sci., 7, 389–399 (1969), which references are incorporated herein by reference.

It is a feature of the present invention that the absorbent be essentially completely hydrophobic in nature. In the case of those solid, microporous, polyaromatic adsorbents which do not possess this necessary property (due, for example, to the presence in the adsorbent of reactive, non-hydrophobic monomer, e.g., monomers containing substituents having ionizable hydrogen atoms such as —OH, —NH$_2$, —COOH and the like), the required state of hydrophobicity can be achieved, for example, by means of "silylation." Silylation involves the treatment of the adsorbent with any of a numer of silane derivatives, e.g., dimethyldichlorosilane. See, for example, A. E. Pierce, *Silylation of Organic Compounds* (Pierce Chem. Co. 1968). An example of a solic microporous polyaromatic adsorbent treated in this manner to ensure hydrophobicity is Porapak Q-S (available from Waters Associates).

Heretofore, the behavior of water on gas chromatography columns precluded its use as a calibration standard due to the overlap between the water and ethanol peaks on the chromatogram (poor resolution) which was further aggravated by the "tailing" or broadening of the water peaks. Furthermore, it has been previously thought that, even if water and ethanol could be resolved by gas chromatography, the accuracy of calibration would be less than that achieved through the use of an internal standard, and certainly inadequate for purposes of proofing alcoholic beverages to determine the tax thereon. On the contrary, however, the use of water-ethanol mixtures as external calibration standards in conjunction with the above-described solid, microporous, hyprophobic polyaromatic adsorbents according to the present invention has unexpectedly been found to yield results far superior to prior gas chromatography methods for assaying ethanol-water mixtures of unknown ethanol content, and particularly alcoholic distilled beverages.

In a preferred mode of the invention, two solutions of predetermined volumes of water and absolute ethanol are prepared at 60°F. for use as external standards. One solution is formulated so that the ethanol/water is greater than the ratio believed to subsist in an alcoholic beverage to be tested. The other solution is formulated so that the ethanol/water ratio is less than that of the beverage. The exact proofs of the standard solutions are measured with the use of precision hydrometers at 60°F. In this way, the standard solutions, which are shelf stable and can be used repeatedly will "bracket" the range of ratios expected to be encountered in proofing a number of beverages.

In order to avoid overloading the chromatographic column with neat mixtures of water and ethanol, a diluent is employed which is prepared by adding 200 milliliters of, say, n-propanol to a 500 milliliter volumetric flask and filling to mark with tetrahydrofuran. The sample vials are charged by aspirating exactly 0.4 milliliters of sample (standard or beverage to be tested) and dispensing, using an automatic pipet, 1.2 milliliters of diluent solution to each vial (giving a total of 1.6 milliliters of solution per vial) which is then capped, shaken, and placed in the sample tray of an autosampler. In this way, three vials for each sample are prepared. It is not intended that the present invention be limited to the use of any specific solvents. On the contrary, any of a number of liquid diluents which are anhydrous, initially free of ethanol, miscible with both water, ethanol, and mixtures thereof are suitable provided further that the solvent or diluent does not interfere with the chromatographic separation of water and/or ethanol, and the quantitation thereof. Other examples of suitable solvents are n-butanol, iso-butanol, 2-methyl 1-butanol, 3-methyl 1-butanol, 2 pentanol, and 3-pentanol.

The contents of each vial are analyzed chromatographically by injecting, using an automatic sampler, 1.5 microliters thereof into a copper column packed with 80/100 mesh Chromosorb 102 and equipped with a thermal conductivity detector. The column, injector port, and detector temperatures are, respectively, 140°C., 200°C. and 200°C. The carrier gas flow rate is 40 milliliters per minute. These operating conditions can be adjusted, if necessary, in order to achieve base line separation between water and ethanol, with the retention times for water and ethanol being, respectively, about 30 seconds and about 90 seconds.

The areas under the water and ethanol peaks on the gas chromatogram of each sample injected are determined by the use of an electronic integrator. The ethanol/water peak area ratio for each sample will be the average of the values obtained on the three vials prepared for that sample. Using the ratios corresponding to the external standards of known proofs, a linear relationship or response graph can be derived using proof as the abscissa and ethanol/water peak area ratio as the ordinate. The slope, $m$, of the straight line corresponding to the response plot is given by the following formula:

$$\text{Slope} = m = \frac{\text{Ratio}_1 - \text{Ratio}_2}{\text{Proof}_1 - \text{Proof}_2}$$

wherein $\text{Ratio}_1$ is the average ethanol peak area/water peak area ratio for the higher proof standard solution, $\text{Proof}_1$ is the corresponding proof at 60°F. as determined by hydrometer and $\text{Ratio}_2$ and $\text{Proof}_2$ are the ratio and proof for the lower proof standard solution. For each of the three vials corresponding to the beverage to be analyzed, the ethanol area/water area ratio is computed and the average ratio determined for the three vials. Assuming that the proof of the beverage lies between the two proofs of the standard solutions, the proof of the beverage can be found from the foregoing response plot as follows:

$$m = \frac{R_c - R_x}{P_c - P_x}$$

wherein $m$ is the slope of the response plot obtained from the two standard solutions, $R_c$ and $P_c$ are, respectively, the ethanol area/water area ratio and proof of the higher proof standard solution, and $R_x$ and $P_x$ are, respectively, the ethanol area/water area ratio and proof for the beverage being tested. The object of determination, namely the proof of the beverage being tested, is given by solving the preceding equation for $P_x$:

$$P_x = P_c - \frac{(R_c - R_x)}{m}$$

It is a feature of the present invention that the coefficient of variation, expressed as a percentage (100× standard deviation ÷ average proof), is less than 0.6 percent, which is within the limits of accuracy required by the U.S. Treasury Department.

DESCRIPTION OF THE DRAWINGS

In the drawings.

FIGS. 2A, 2B and 2C are pictorial representations of three separate gas chromatograms obtained from the analog strip chart recorder shown in FIG. 1.

Referring particularly to FIGS. 2A, 2B and 2C, there are depicted three chromatograms (not necessarily drawn to scale nor necessarily shown in the order in which they are recorded) such as would be obtained by conducting the gas-solid chromatographic proofing method of the present invention. FIG. 2B depicts the chromatogram of a sample of an alcoholic beverage of unknown proof containing negligible fusel oils (e.g., vodka) which has been diluted with a two-component diluent (e.g., a mixture of n-propanol and tetrahydrofuran). Peaks 1 and 2 of FIG. 2B correspond respectively to the water and ethanol components of the beverage sample. Peaks 3 and 4 of FIG. 2B correspond to the two components of the diluent (n-propanol and tetrahydrofuran, respectively). The numbering of the peaks reflects the order in which the respective components come off the column. FIGS. 2A and 2C depict the chromatograms of two standard water-ethanol solutions which have been diluted in the same manner as the beverage sample. In FIG. 2A, the volumetric ethanol content of the standard solution is below that in the beverage being tested, while in FIG. 2C, the ethanol content of the standard solution is above that of the beverage. Thus, the chromatograms of FIGS. 2A and 2C are said to "bracket" the chromatogram of the alcoholic beverage whose proof is being determined.

DESCRIPTION OF THE PREFERRED EMBODIMENTS

Figure 1:
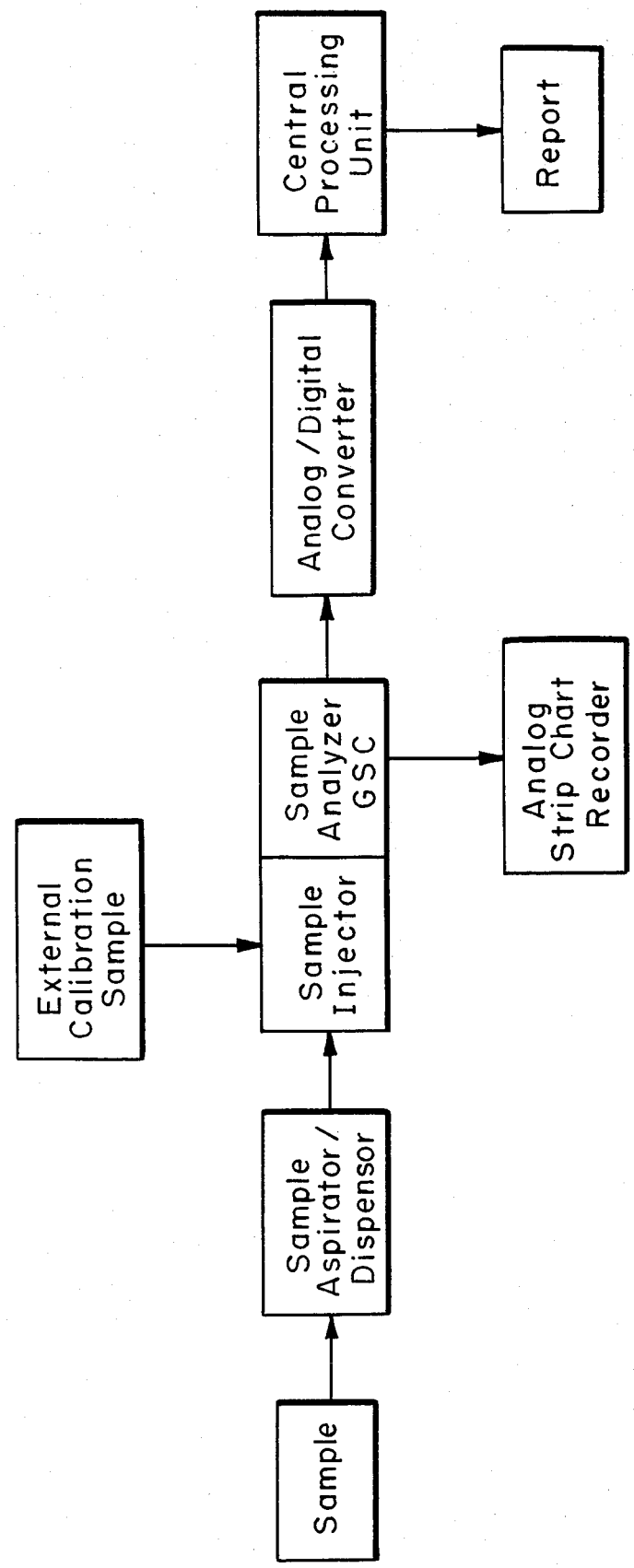
FIG. 1 is a block flow diagram showing the steps and apparatus used in carrying out the gas-solid chromatographic method of the invention.

The following examples are presented for the purpose of illustrating (but not limiting) the application and advantages of the gas-solid chromatographic method of the present invention.

EXAMPLE I

A Hewlett-Packard Model 5712A gas chromatograph with a dual thermal conductivity detector and with a heated injection port is set to operate with an inject port temperature of 200°C., a detector temperature of 200°C., a detector current of 185 milliamperes, a column oven temperature of 140°C. and a helium carrier gas flow of 40 milliliters per minute. With respect to the detector, it is found that a flame ionization type detector is not suitable for use according to the method of the present invention because of its lack of ability to respond to the water component of the sample. In addition, the use of a thermal conductivity detector is advantageous over that of a flame ionization detector because the former is not subject to as many different factors which can introduce possible errors, e.g., hydrogen and air flow rates, carrier gas flow rates, and detector optimization requirements. The column is a 80/100 mesh Chromosorb 102 adsorbent that is packed into a 6 foot by ⅛ inch outer diameter copper tube. The sample is introduced with a Hewlett-Packard Model 7671A Auto Sampler, with a syringe injection volume of 1.5 microliters (set at Stop 1 on the control module), and using the minimum wash cycle. The analysis is set at 8 minutes and the integration timer is also set at 8 minutes.

The data are handled electronically using the Spectra-Physics Autolab System IV Computing Integrator.

For each sample to be analyzed, three analysis vials are prepared by using the Labindustries Automatic Dilutor Catalog No. 81001. Into each analysis vial using the Automatic Dilutor, 0.4 milliliter of sample is dispensed along with 1.2 milliliters of diluent (prepared by adding 200 milliliters of n-propyl alcohol to a 500 milliliter volumetric flask and bringing to 500 milliliters volume with anhydrous tetrahydrofuran). The vials are capped and shaken to thoroughly mix the solution and are then placed into the Auto Sampler for analysis.

Prior to the preparation of the samples for analysis, calibration standards that will bracket in proof the samples to be analyzed are prepared by carefully measuring calculated amounts of absolute ethanol and mixing with calculated amounts of distilled water. The actual amounts employed depend upon the desired proof of the sample being prepared. Proof of these calibration standards is determined by using hydrometer and thermometer and correcting the results to 60°F. From each calibration standard three vials are prepared in the same manner as outlined for the samples. These vials are placed into the Auto Sampler and are subjected to chromatographic analysis.

The data emerging from the Autolab System IV is subjected to mathematical treatment in the manner described hereinabove to obtain the proof of the unknown sample being tested. The results for an unknown sample in the 80° range are summarized in Table I, below.

TABLE I

Determination of Proof of Unknown Samples in 80° Proof Range

| Ethanol Area* / Water Area | | | | Proof | |
| --- | --- | --- | --- | --- | --- |
| 85.03° Calb. Std. | 74.77° Calb. Std. | Unknown A | Calb. Slope | GSC | Hydrometer |
| 0.3986 | 0.3252 | 0.3457 | 0.007154 | 77.64 | 77.65 |

*Mean of three injections, one injection being made from each of three vials per sample As can be seen from the results summarized in Table I, above, the proof of the unknown sample as determined by the gas-solid chromatographic method of the invention (GSC) is in excellent agreement with that obtained by using the standard accepted hydrometer method.

EXAMPLE II

This example demonstrates the accuracy and precision of the gas-solid chromatographic method of the present invention as compared to two of the presently accepted Bureau of Alcohol, Tobacco and Firearms (BATF) methods, i.e., proofing by direct hydrometer and by direct pycnometer.

Six ethanol-water mixtures are prepared, three in the 140° proof level and three in the 80° proof level. The particular proof of each sample is first determined by the direct hydrometer method. The individual samples are then each divided into two aliquots. One aliquot from each of the six samples is proofed by direct pycnometer and the other aliquot from each sample is subjected to ethanol determination according to Example 1, above.

Table II, below, compares the proof of each of the six samples as determined by gas-solid chromatography, pycnometer and hydrometer methods, and demonstrates that each of the three methods gives essentially the same proof for each sample. In the 140° proof level, the ranges of variation in the results are generally less than or equal to 0.3 proof degree, while in the 80° proof level the range of variation is 0.1 proof degree.

TABLE II

Comparison of Proof Determinations by GSC, Hydrometer and Pycnometer

| Method | 140° Proof Level Sample No. | | | 80° Proof Level Sample No. | | |
|---|---|---|---|---|---|---|
| | 1 | 2 | 3 | 1 | 2 | 3 |
| Hydrometer | 142.11° | 140.12° | 138.43° | 77.88° | 78.86° | 81.80° |
| Pycnometer | 141.90° | 139.89° | 138.20° | 77.86° | 79.77° | 81.72° |
| Gas-Solid Chromatography | 142.22° | 140.07° | 138.44° | 77.84° | 79.70° | 81.77° |
| Mean | 142.08° | 140.03° | 138.36° | 77.86° | 79.78° | 81.76° |
| Std. Deviation | 0.16° | 0.12° | 0.14° | 0.02° | 0.08° | 0.04° |
| C.V.* | | | | 0.03% | 0.10% | 0.05% |
| | 180.11% | 180.09% | 180.10% | | | |
| Range | 0.32° | 0.23° | 0.24° | 0.04° | 0.16° | 0.08° |

*C.V. = coefficient of variation expressed as the standard deviation as a percentage of the mean proof.

The data of Table II, above, demonstrate that at the 140° and 80° proof levels, the results of the gas-solid chromatography method of the invention are in very close agreement with and in most cases practically identical to the proofs obtained using the presently accepted government procedures.

EXAMPLE III

This example illustrates the use and advantages of the method of the invention as applied to the proofing of commercially available vodka.

Three separate vodkas, each from a different distillery are first analyzed for fusel oils and dissolved solids. In all three cases, there are not detectable concentrations of fusel oils or solids. Each beverage is then subjected to gas-solid chromatographic analysis according to the three-vial-per-sample technique of Example I, above, and again according to the conventional hydrometer method.

In determining proof by hydrometer, four separate readings with four separate hydrometers are used for each beverage, the results being combined to give an average proof for each vodka. The results of the proof determinations made according to the present invention and by the above-described hydrometer method are summarized in Table III, below.

TABLE III

Determination of Vodka Proof By GSC and Hydrometer

| Sample | Proof Hydrometer | GSC* |
|---|---|---|
| 1 (Smirnoff) | 79.94 | 79.94 |
| 2 (Gilbey) | 80.01 | 80.00 |
| 3 (Taaka) | 80.01 | 80.00 |

*Calibration slope 0.0083; calibration standards 81.76°/77.86°

The data in Table III, above, show excellent agreement between the proof for each sample as determined by hydrometer and according to the present invention.

EXAMPLE IV

This example illustrates the advantages in applying the method of the present invention to the proofing of commercially available bourbon, which is generally characterized by low solids content but high fusel oil concentrations.

Three separate bourbons, each from a different distillery were proofed in the manner according to Example I, above, and again according to the conventional hydrometer method.

In determining proof by hydrometer, each bourbon is analyzed by several different technicians, each using several different hydrometers. The mean or average proof reading obtained by each technician is then used as his proof for the respective sample and his data are evaluated statistically. To obtain, under the classical hydrometer method of analysis, the proof of each sample, all the readings for each sample are averaged and this average is reported as the proof for that sample; additionally, all of the data for each sample are subjected to statistical analysis. These data and the results of the statistical treatment thereof are summarized in Tables IV and V, below.

TABLE IV

Proof Determination of Bourbon by Direct Hydrometer

| Analyst | No. of Readings | Mean[1] Proof | Standard Deviation | Coefficient of Variation (C.V.) | Range |
|---|---|---|---|---|---|
| Bourbon No. 1 | | | | | |
| No. 1 | 4 | 85.85° | 0.04° | 0.05% | 0.07° |
| No. 2 | 4 | 85.79° | 0.06° | 0.07% | 0.11° |
| No. 3 | 4 | 85.71° | 0.08° | 0.09% | 0.15° |
| No. 4 | 4 | 85.79° | 0.10° | 0.12% | 0.19° |
| Bourbon No. 2 | | | | | |
| No. 1 | 4 | 85.86° | 0.03° | 0.03% | 0.06° |
| No. 2 | 4 | 85.89° | 0.05° | 0.06% | 0.10° |
| No. 4 | 4 | 85.85° | 0.09° | 0.10% | 0.17° |
| Bourbon No. 3 | | | | | |
| No. 1 | 4 | 85.82° | 0.06° | 0.07% | 0.12° |
| No. 4 | 4 | 85.89° | 0.10° | 0.12% | 0.18° |

[1]Mean of four proofs as determined using "ultra precision" hydrometers with 0.1° graduations rather than the usual 0.2° graduations.

TABLE V

Statistical Evaluation of Bourbon Proofs Obtained by Direct Hydrometer

| Bourbon | Observations | Population Mean | Population Standard Deviation | Population c.v. | Population Range |
|---|---|---|---|---|---|
| No. 1 | 16 | 85.78° | 0.08° | 0.09% | 0.25° |
| No. 2 | 12 | 85.87° | 0.06° | 0.07% | 0.17° |
| No. 3 | 8 | 85.86° | 0.08° | 0.09% | 0.25° |

In applying the method of the invention to bourbons, each beverage is subjected to analysis on separate occasions, using different sets of standard solutions. Three vials are prepared from each different bourbon. The data from the gas chromatograph are summarized in Table VI, which reveals the high degree of reproducibility (precision) in the method of the invention.

TABLE VI

Proof Determination of Bourbon by GSC[1]
Bourbon No. 1

| Calibration Slope | Calibration Standards | Proof | Mean | Standard Deviation | Coefficient of Variation | Range |
|---|---|---|---|---|---|---|
| 0.0092 | 87.42°/84.83° | 86.06° | | | | |
| 0.0093 | 87.42°/84.83° | 86.07° | | | | |
| 0.0089 | 87.42°/84.83° | 86.14° | | | | |
| 0.0086 | 87.42°/77.65° | 86.09° | | | | |
| | | | 86.09° | 0.04° | 0.05% | 0.08° |
| | | Bourbon No. 2 | | | | |
| 0.0092 | 87.42°/84.83° | 86.02° | | | | |
| 0.0093 | 87.42°/84.83° | 86.06° | | | | |
| 0.0089 | 87.42°/84.83° | 86.14° | | | | |
| 0.0086 | 87.42°/77.65° | 86.09° | | | | |
| | | | 86.08° | 0.05° | 0.06% | 0.12° |
| | | Bourbon No. 3 | | | | |
| 0.0092 | 87.42°/84.83° | 86.35° | | | | |
| 0.0093 | 87.42°/84.83° | 86.36° | | | | |
| 0.0089 | 87.42°/84.83° | 86.35° | | | | |
| 0.0086 | 87.42°/77.65° | 86.31° | | | | |
| | | | 86.34° | 0.02° | 0.03% | 0.04° |

[1]Chromatographic Conditions: Identical to those reported in Example I

A comparison of the results summarized in Tables V and VI, above, reveals that the bourbon proofs determined according to the present invention (Table VI) were, in all cases, higher than the corresponding proofs measured by hydrometer (Table V). Since each of the bourbon samples contains less than 400 grams of solids per 100 liters of beverage, the true proof, by government definition (26 CFR 186.31a), is obtained by the hydrometer method, but without a preceding distillation step. Upon inspection of the samples, however, it can be expected that there should be at least some type of solids present, attributable to, if nothing else, the very dark color of the sample. On this assumption, and using sample No. 3, the sample with the greatest disparity between methods in reported proof, a dry solids determination is made in accordance with the BATF regulations (27 CFR 186.32a). That is, 25 milliliters of sample are evaporated, dried, and the weight of the residue obtained is multiplied by 4 to get milligrams of solids per 100 milliliters of solution. This figure, according to BATF guidelines and regulations, is again multiplied by 4 to obtain the appropriate government obscuration factor. These data are outlined in Table VII which shows that the solids content of sample No. 3 is sufficient to contribute 0.7° proof to the proof of this sample. When this obscuration factor is added to the direct hydrometer "true" proof, as is done when the solids content is greater than 400 milligrams per 100 milliliters of beverage, the "new proof" agrees well with that obtained according to the present invention (Table VI). Table VIII summarizes the effect of adding the solids obscuration factor to the apparent proof as determined with a hydrometer and comparing this "true proof" with the proof obtained by gas chromatography according to the present invention.

TABLE VII

Dry Solids Obscuration, Bourbon No. 3

| | Analysis No. 1 | Analysis No. 2 |
|---|---|---|
| Dry Residue Weight | 61.4885 gm | 69.5355 gm |
| Tare | 61.4156 gm | 69.4923 gm |
| Solids per 25 ml | 0.0429 gm | 0.0432 gm |
| Solids per 100 ml | 0.1716 gm | 0.1728 gm |
| Obscuration Factor | 0.6864° | 0.6919° |
| "True Proof" 85.86+ | 86.55° | 86.55° |

TABLE VIII

| Method | Proof Technique Evaluation, Bourbon No. 3 Proof | c. v. |
|---|---|---|
| Hydrometer | 85.86° | 0.09%[1] |
| Hydrometer + Solids | 86.55° | |
| GSC | 86.34° | 0.03%[2] |

[1]See Table V
[2]See Table VI

In those instances where there are measurable solids present, a true proof can only be obtained by distilling the sample and then measuring the proof with a hydrometer. Table IX, below, gives the proof as determined for sample No. 3 following distillation. Due to the fact that there may be mechanical losses during the distillation procedure, a GSC proof determination is also run on the distilled sample, and these data are also presented in Table IX. Footnote 1 of Table IX indicates that the GSC determination has a coefficient of variation of 0.31%. The coefficients of variation for the calibration standards were also quite good; calibration standard proof 87.42 had a c.v. of 0.23% and the 77.65 proof standard has a c.v. of 0.06%. These data substantiate the validity of the GSC proof of 86.08 on the distillate of bourbon sample No. 3. When the GSC proof in Table IX is compared to that given in Table VIII, it is clear that there are some mechanical losses during the distillation process. Table IX also indicates that following distillation there remains a difference between the proof as determined by hydrometer and the GSC proof. There are no solids in the distillate, but, there are fusel oils present. Table X lists the fusel oils found in sample No. 3 both before and after distillation. The density of each of the fusel oil components closely approximates the density of ethanol. In fact, the average density for the four fusel oil components listed is 0.8 which is very close to the density for ethanol, 0.7893. By assuming that the fusel oils have a density equivalent to ethanol, the total fusel oil content in grams per 100 liters may be assumed to be additional ethanol, which contributes undesirably in some measure to the density of the beverage, thereby tending to inflate the proof as measured by hydrometer.

TABLE IX

True Proof of Bourbon Sample No. 3 Following Distillation

| Method | Proof |
|---|---|
| Distillation/Stem | 86.44° |
| GSC | 86.08°[1] |

[1]GSC determination c.v. = 0.31%

TABLE X

Fusel Oil Profile of Bourbon Sample No. 3 Before and After Laboratory Distillation

| Bourbon No. 3 | Total Fusel Oil gm/100L | n-PrOH gm/100L | i-BuOH gm/100L | Act-Amyl gm/100L | i-Amyl gm/100L |
|---|---|---|---|---|---|
| Run 1 (Before Dist) | 206.79 | 12.16 | 47.70 | 44.55 | 102.39 |
| Run 2 (Before Dist) | 207.46 | 11.97 | 47.74 | 44.60 | 103.15 |
| Average | 207.13 | 12.07 | 47.72 | 44.57 | 102.77 |
| Run 1 (After Dist) | 210.13 | 11.38 | 47.69 | 46.14 | 104.92 |
| Run 2 (After Dist) | 209.44 | 11.13 | 47.51 | 46.25 | 104.55 |
| Average | 209.79 | 11.26 | 47.60 | 46.20 | 104.74 |

The foregoing results for bourbon demonstrate the great advantage of accuracy inherent in the present invention over the current density method of proofing alcoholic beverages containing dissolved solids and/or fusel oils. The method of the present invention circumvents the need to take into account the effects of these ingredients by measuring only water and ethanol.

EXAMPLE V

This example illustrates the application and advantages of the invention with regard to determining the ethanol content of Puerto Rican rum. This beverage differs from vodka (low solids, low fusel oils) and bourbon (low solids, high fusel oils) in having high solids but low fusel oil concentrations. The dissolved solids content of rum is roughly three to five times greater than the dissolved solids content of bourbon, whereas the fusel oil content of rum is only about one-tenth that of bourbon. The very high solids content of rum dictates that distillation must precede proofing by the conventional density technique. However, distillation introduces the element of error arising from mechanical losses during the manipulation of the rum sample. Accordingly, the gas-solid chromatographic method of the present invention (which avoids distillation) is particularly advantageous in the proofing of this type of alcoholic beverage.

In order to precisely compare rum proof by GSC with that determined by the hydrometer method and avoid the effect of mechanical losses known to occur during distillation, both methods are applied to a distilled sample of rum. Operating in this manner, the proofs determined on the distillate by the method of the invention are found to be consistently lower than the proofs when measured using a hydrometer. The average (15 runs) difference existing between the proof as determined by hydrometer and the GSC proof of the distillate is approximately 0.21 proof degree; that is, the GSC method consistently reports a proof lower by 0.21 proof degree than that reported by the hydrometer. Since the sample being proofed had already been distilled, the solids and other materials such as the volatile acids would have remained behind in the distillation pot whereas fusel oils (albeit in small amounts) and other such materials would probably be in the distillate. To confirm this possibility, the fusel oil content of the distilled sample is determined and it is noted that the distillate indeed contains the same degree of fusel oils as the non-distilled beverage.

The foregoing results establish the benefits obtained by proofing low fusel oil-containing alcoholic beverages using the GSC method of the present invention which is sensitive only to alcohol and water.

I claim:

1. A high-resolution method for determining the proof, $P_x$, of an alcoholic beverage containing water and ethanol, said method comprising the steps of:
   a. forming a solution of a known volume of ethanol and a known volume of water and having a known proof, $P_1$, wherein the volumetric ratio of ethanol-to-water, $R_1$, is greater than the volumetric ratio of ethanol-to-water, $R_x$, in the beverage;
   b. forming a solution of a known volume of ethanol and a known volume of water and having a known proof, $P_2$, wherein the volumetric ratio of ethanol-to-water, $R_2$, is less than the volumetric ratio of ethanol-to-water in the beverage;
   c. subjecting the solutions formed in steps (a) and (b) and the beverage to gas-solid chromatography in a column containing a solid, microporous, hydrophobic organic polymeric absorbent of high surface area derived from the copolymerization of divinyl benzene and a vinyl hydrocarbon monomer;
   d. passing the beverage and solutions chromatographed in step (c) through a thermal conductivity detector to generate a signal corresponding to each component of the solutions formed in steps (a) and (b) and the beverage;
   e. converting the signals generated in step (d) to numerical values corresponding to the volumes of water and ethanol in the solutions formed in steps (a) and (b) and the beverage; and
   f. subjecting the numerical values obtained in step (e) to mathematical treatment according to the relationship $$P_x = P_1 - \frac{(R_1 - R_x)}{m}$$

wherein $m = \dfrac{R_1 - R_2}{P_1 - P_2}$

2. A method according to claim 1 wherein the solid adsorbent had an average pore diameter of less than about 100 Angstroms, a surface area of at least about 250 square meters per gram, and is derived from the copolymerization of divinyl benzene and a vinyl aromatic hydrocarbon monomer containing a single polymerizable —CH=CH$_2$ substituent.

3. A method according to claim 2 wherein the adsorbent is derived from the copolymerization of divinyl benzene and styrene.

4. A method according to claim 2 wherein the adsorbent is derived from the copolymerization of divinyl benzene and ethylvinyl benzene.

5. A method according to claim 1 wherein the solutions formed in steps (a) and (b) and the beverage are each diluted with a liquid diluent.

6. A method according to claim 5 wherein the diluent consists essentially of n-propanol and tetrahydrofuran.

7. A method according to claim 5 wherein;
the column used in step (c) is operated at a temperature of between about 100°C. and about 200°C.; and the thermal conductivity detector used in step (d) is operated at a temperature of between about 150°C. and about 250°C.

8. A method according to claim 7 wherein:
the column is operated in step (c) at a temperature between about 130°C. and about 150°C.;
the thermal conductivity detector is operated in step (d) at a temperature of between about 190°C. and about 210°C.

* * * * *

UNITED STATES PATENT AND TRADEMARK OFFICE
CERTIFICATE OF CORRECTION

PATENT NO. : 3,896,659
DATED : July 29, 1975
INVENTOR(S) : D. E. Goodman

It is certified that error appears in the above-identified patent and that said Letters Patent are hereby corrected as shown below:

Col. 5, line 5, "numer" should read --number--.

Col. 5, line 34, "/water is" should read --/water ratio is--.

Col. 7, line 42, "inject" should read --injection--.

Col. 7, lines 41 and 42, "inject" should read -- injection --.

Col. 9, line 21, between "C.V." and "0.03%" insert --0.11% 0.09% 0.10%--.

Col. 9, line 22, delete "180.11% 180.09% 180.10%--.

Col. 9, line 42, "not" should read --no--.

Col. 11, line 40, "27 CFR" should read --26 CFR--.

Col. 15, line 12, ";" should read --:--.

Signed and Sealed this ninth Day of December 1975

[SEAL]

Attest:

RUTH C. MASON
Attesting Officer

C. MARSHALL DANN
Commissioner of Patents and Trademarks